(12) United States Patent
Jeon et al.

(10) Patent No.: US 11,897,470 B2
(45) Date of Patent: Feb. 13, 2024

(54) APPARATUS AND METHOD FOR CONTROLLING A POWERTRAIN OF AN AUTONOMOUS VEHICLE

(71) Applicants: HYUNDAI MOTOR COMPANY, Seoul (KR); KIA CORPORATION, Seoul (KR)

(72) Inventors: Byeong Wook Jeon, Seoul (KR); Min Jae Chai, Suwon-si (KR); Yong Uk Shin, Seongnam-si (KR); Dong Hoon Jeong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 287 days.

(21) Appl. No.: 17/372,065

(22) Filed: Jul. 9, 2021

(65) Prior Publication Data

US 2022/0153269 A1 May 19, 2022

(30) Foreign Application Priority Data

Nov. 16, 2020 (KR) .......................... 10-2020-0153116

(51) Int. Cl.
*B60W 30/18* (2012.01)
*B60W 60/00* (2020.01)
*B60W 10/02* (2006.01)
*B60W 10/10* (2012.01)
*B60W 10/06* (2006.01)

(52) U.S. Cl.
CPC ...... *B60W 30/18072* (2013.01); *B60W 10/02* (2013.01); *B60W 10/06* (2013.01); *B60W 10/10* (2013.01); *B60W 60/001* (2020.02); *B60W 2030/1809* (2013.01); *B60W 2520/10* (2013.01); *B60W 2552/00* (2020.02); *B60W 2554/4042* (2020.02); *B60W 2556/50* (2020.02); *B60W 2710/021* (2013.01); *B60W 2710/0666* (2013.01); *B60W 2710/1005* (2013.01)

(58) Field of Classification Search
CPC ........................... B60W 60/001; G05D 1/0088
See application file for complete search history.

(56) References Cited

U.S. PATENT DOCUMENTS

| 9,766,629 | B1 * | 9/2017 | Konchan | G08G 1/167 |
| 9,849,880 | B2 * | 12/2017 | D'Amato | B60W 30/143 |
| 2018/0134296 | A1 * | 5/2018 | Oh | B60W 10/08 |
| 2019/0129440 | A1 * | 5/2019 | Borhan | G05D 1/0223 |
| 2021/0253097 | A1 * | 8/2021 | Lacaze | G08G 1/22 |

* cited by examiner

*Primary Examiner* — Sizo B Vilakazi
(74) *Attorney, Agent, or Firm* — Lempia Summerfield Katz LLC

(57) ABSTRACT

An apparatus and method are provided for controlling a powertrain of an autonomous vehicle. The apparatus includes an autonomous driving controller that controls autonomous driving of the vehicle and a transmission controller that determines whether the vehicle satisfies a pulse and glide (P&G) driving condition during the autonomous driving. The transmission controller alternately performs pulse driving and coasting in conjunction with the autonomous driving controller when the vehicle satisfies the P&G driving condition. The transmission controller causes a transmission to remain in a neutral state during the coasting.

18 Claims, 5 Drawing Sheets

APPARATUS AND METHOD FOR CONTROLLING A POWERTRAIN OF AN AUTONOMOUS VEHICLE

CROSS-REFERENCE TO RELATED APPLICATION

This application claims the benefit of priority to Korean Patent Application No. 10-2020-0153116, filed in the Korean Intellectual Property Office on Nov. 16, 2020, the entire contents of which are incorporated herein by reference.

TECHNICAL FIELD

The present disclosure relates to an apparatus and method for controlling a powertrain of an autonomous vehicle.

BACKGROUND

In the case of an internal combustion engine, a most fuel-efficient condition (engine torque vs. engine RPM) in a driving region exists. When the engine is operated in that region, the highest energy efficiency may be achieved. When engine torque and engine RPM are determined, the speed of a vehicle is determined depending on running resistance. Therefore, when a driver does not want to drive the vehicle at the determined speed, the most fuel-efficient condition is difficult to achieve even though an optimum efficiency point of the engine exists. Accordingly, fuel consumption may be reduced by a pulse and glide (P&G) driving method of accelerating the vehicle to an upper limit of a target speed range at the optimum efficiency point of the engine, decelerating the vehicle, and accelerating the vehicle again to the upper limit of the target speed range at the optimum efficiency point when the speed of the vehicle reaches a lower limit of the target speed range. When a transmission is shifted to a neutral state in a coasting deceleration condition of the vehicle, a coasting distance is increased. Accordingly, the frequency of re-acceleration may be reduced when a driving distance is the same, and thus fuel consumption may be additionally reduced. However, when the vehicle is accelerated again during the neutral driving, a feeling of acceleration is generated after engagement of a clutch. Therefore, an acceleration response delay of about 0.3 seconds to about 0.4 seconds is inevitable.

SUMMARY

The present disclosure has been made to solve the above-mentioned problems occurring in the prior art while maintaining advantages achieved by the prior art.

An aspect of the present disclosure provides an autonomous vehicle powertrain control apparatus and method for improving fuel economy through cooperative control of an engine and a clutch during autonomous driving.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, an apparatus for controlling a powertrain of an autonomous vehicle includes an autonomous driving controller that controls autonomous driving of the vehicle and a transmission controller that determines whether the vehicle satisfies a pulse and glide (P&G) driving condition during the autonomous driving. The transmission controller alternately performs pulse driving and coasting in conjunction with the autonomous driving controller when the vehicle satisfies the pulse and glide (P&G) driving condition. The transmission controller causes a transmission to remain in a neutral state during the coasting.

The transmission controller may receive, from a navigation device, information about a road ahead and may receive speed of a preceding vehicle from a front radar. The transmission controller may determine whether the vehicle satisfies the P&G driving condition based on the information about the road ahead and the speed of the preceding vehicle.

The transmission controller may determine whether the vehicle satisfies the P&G driving condition in consideration of current driving speed of the vehicle and whether P&G driving is prohibited by the autonomous driving controller.

The transmission controller may receive a target driving speed from the autonomous driving controller and may determine a P&G driving speed range based on the target driving speed.

The transmission controller may engage a clutch and may thereafter request an engine controller to output engine torque. The autonomous driving controller may perform the pulse driving through acceleration driving control.

The transmission controller may perform the coasting by requesting the engine controller to stop the output of the engine torque and disengaging the clutch when vehicle speed reaches maximum speed in the P&G driving speed range during the pulse driving.

The transmission controller may perform the pulse driving again when the vehicle speed falls within a predetermined range from minimum speed in the P&G driving speed range during the coasting.

The transmission controller may prohibit the transmission from being in neutral during the pulse driving.

The transmission controller may request the autonomous driving controller to prohibit acceleration manipulation during the coasting. The transmission controller may request the engine controller to prohibit acceleration during the coasting.

According to another aspect of the present disclosure, a method for controlling a powertrain of an autonomous vehicle includes: a step of determining whether the vehicle satisfies a P&G driving condition during autonomous driving; a step of performing pulse driving, when the vehicle satisfies the P&G driving condition; a step of performing coasting with a transmission in neutral, when the vehicle satisfies a condition for ending the pulse driving; and a step of returning to the step of performing the pulse driving, when the vehicle satisfies a condition for ending the coasting.

The step of determining whether the vehicle satisfies the P&G driving condition may include: a step of receiving, from a navigation device, information about a road ahead; a step of receiving speed of a preceding vehicle from a front radar; and a step of determining whether the vehicle satisfies the P&G driving condition, based on the information about the road ahead and the speed of the preceding vehicle.

The step of determining whether the vehicle satisfies the P&G driving condition may further include a step of determining whether the vehicle satisfies the P&G driving condition, in consideration of current driving speed of the vehicle and whether P&G driving is prohibited.

The step of performing the pulse driving may include a step of receiving a target driving speed from an autonomous driving controller and a step of determining a P&G driving speed range based on the target driving speed.

The step of performing the pulse driving may further include a step of engaging a clutch, requesting an engine controller to output engine torque, and causing the autonomous driving controller to perform acceleration driving control. The step of performing the pulse driving may further include a step of determining whether vehicle speed reaches maximum speed in the P&G driving speed range.

The step of performing the coasting may include: a step of requesting the engine controller to stop the output of the engine torque when the vehicle speed reaches the maximum speed; a step of performing the coasting by disengaging the clutch after the output of the engine torque is stopped; and a step of determining whether the vehicle speed is within a predetermined range from minimum speed in the P&G driving speed range.

The step of returning to the step of performing the pulse driving may include a step of disengaging the clutch, when the vehicle speed is within the predetermined range from the minimum speed, and a step of requesting the engine controller to output engine torque after the clutch is disengaged.

The method may further include a step of prohibiting the transmission from being in neutral while the pulse driving is performed.

The method may further include a step of requesting an autonomous driving controller to prohibit acceleration manipulation during the coasting and requesting an engine controller to prohibit acceleration during the coasting.

BRIEF DESCRIPTION OF THE DRAWINGS

The above and other objects, features, and advantages of the present disclosure will be more apparent from the following detailed description taken in conjunction with the accompanying drawings.

DETAILED DESCRIPTION

Figure 1:
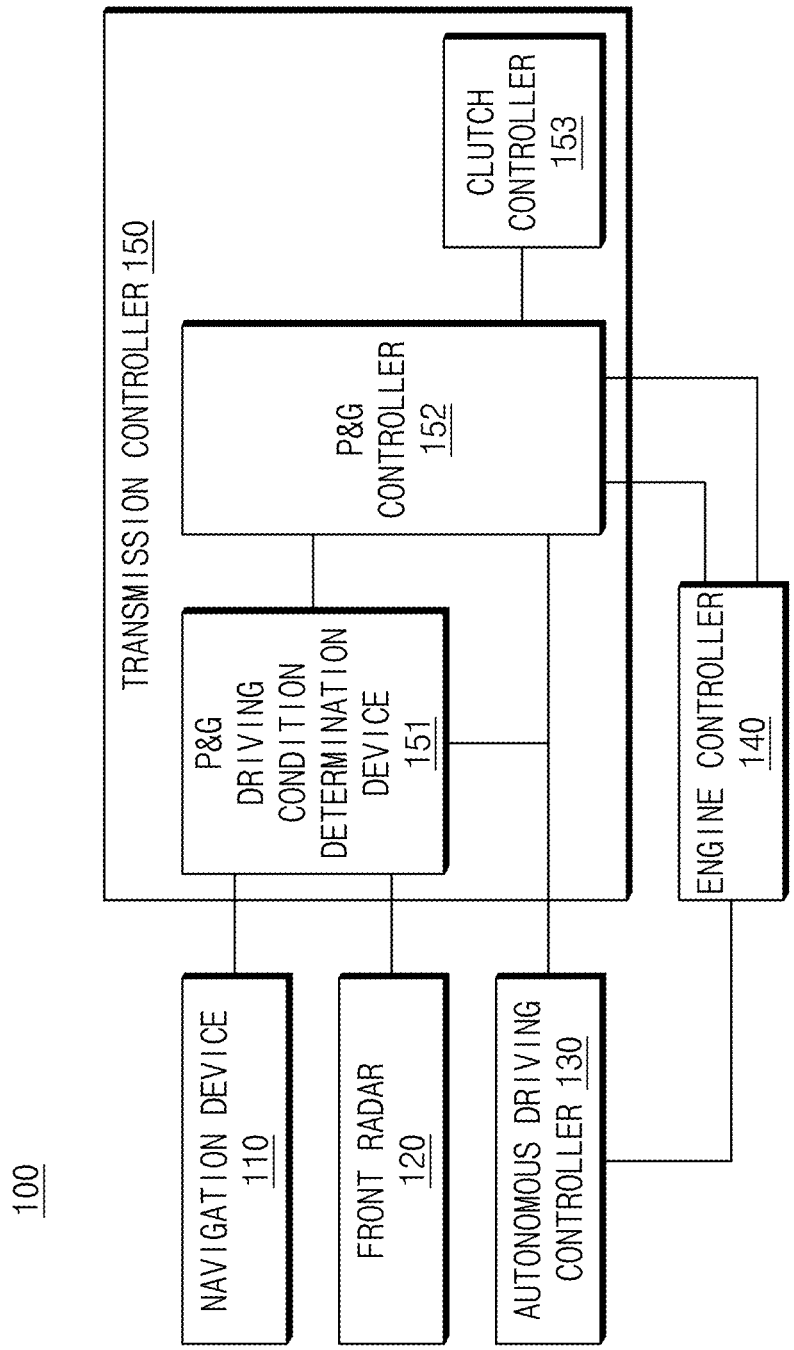
FIG. 1 is a block diagram illustrating an apparatus for controlling a powertrain of an autonomous vehicle according to embodiments of the present disclosure.

Hereinafter, some embodiments of the present disclosure are described in detail with reference to the drawings. In adding the reference numerals to the components of each drawing, it should be noted that the identical or equivalent component is designated by the identical numeral even when displayed on other drawings. Further, in describing the embodiments of the present disclosure, a detailed description of well-known features or functions have been omitted in order not to unnecessarily obscure the gist of the present disclosure.

In describing the components of the embodiments according to the present disclosure, terms such as first, second, "A", "B", (a), (b), and the like may be used. These terms are merely intended to distinguish one component from another component, and the terms do not limit the nature, sequence or order of the components. When a component, device, element, or the like of the present disclosure is described as having a purpose or performing an operation, function, or the like, the component, device, or element should be considered herein as being "configured to" meet that purpose or to perform that operation or function. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings equal to the contextual meanings in the relevant field of art. Such terms are not to be interpreted as having ideal or excessively formal meanings unless clearly defined as having such in the present application.

In this specification, disclosed is a powertrain control technology for improving fuel economy by applying neutral coasting to P&G. The P&G is a driving method of repeatedly depressing (Pulse) and releasing (Glide) an accelerator pedal to maintain a predetermined speed region. Neutral coasting is a driving method for improving fuel economy based on real-road driving by increasing a coasting distance by automatically setting a transmission to a neutral position during coasting. As a pumping load of an engine (an engine brake effect) is removed during neutral driving, a vehicle may coast further, and thus fuel economy may be improved.

FIG. 1 is a block diagram illustrating an apparatus for controlling a powertrain of an autonomous vehicle according to embodiments of the present disclosure.

Referring to FIG. 1, the apparatus 100 for controlling the powertrain of the autonomous vehicle includes a navigation device 110, a front radar 120, an autonomous driving controller 130, an engine controller 140, and a transmission controller 150 that are connected using a vehicle communication technology. Here, a controller area network (CAN), a media oriented systems transport (MOST) network, a local interconnect network (LIN), Ethernet, and/or an x-by-wire (Flexray) may be used as the vehicle communication technology.

The navigation device 110, the front radar 120, the autonomous driving controller 130, the engine controller 140, and the transmission controller 150 may each include a processor and a memory. The processor may be implemented with at least one of an application specific integrated circuit (ASIC), a digital signal processor (DSP), programmable logic devices (PLDs), field programmable gate arrays (FPGAs), a central processing unit (CPU), microcontrollers, or microprocessors. The memory is a non-transitory storage medium that stores instructions executed by the processor. The memory may be implemented with a flash memory, a hard disk, a solid state disk (SSD), an embedded multimedia card (eMMC), a universal flash storage (UFS), a random access memory (RAM), a static random access memory (SRAM), a read only memory (ROM), a programmable read only memory (PROM), an electrically erasable and programmable ROM (EEPROM), an erasable and programmable ROM (EPROM), and/or a register.

When a destination is set, the navigation device 110 may search for a driving route to the destination and may perform route guidance. The navigation device 110 may search for an optimum route by reflecting real-time traffic information when searching for a driving route. The navigation device 110 may include a memory, a global positioning system (GPS) receiver, a communication module, and a processor that are not illustrated in the drawing. The memory may store map data. The GPS receiver may determine the location of the vehicle. The communication module may receive traffic information from the outside. The processor may search for a driving route and may perform route guidance based on the found driving route. The navigation device 110 may obtain information about a road ahead on a driving route and may transmit the road information to the transmission controller 150. The road information may include information such as the grade, the curvature, and the like of the road ahead.

The front radar 120 may measure the distance between the vehicle and a surrounding object, and the direction and altitude of the surrounding object, by sending out electromagnetic waves and receiving the electromagnetic waves reflected from the surrounding object. A plurality of front radars 120 may be installed in different positions at the front of the vehicle. The front radar 120 may measure the speed of a preceding vehicle and may transmit the measured vehicle speed to the transmission controller 150.

The autonomous driving controller 130 may recognize a driving environment and/or a vehicle state using various sensors mounted in the vehicle and may control vehicle behavior (e.g., acceleration, deceleration, steering, and/or braking) based on the driving environment and/or the vehicle state recognized. The autonomous driving controller 130 may share a target driving speed of the vehicle with the transmission controller 150. The autonomous driving controller 130 may instruct the transmission controller 150 to prohibit P&G driving control. Furthermore, the autonomous driving controller 130 may request the engine controller 140 to turn engine torque on/off.

The engine controller 140 is an electronic control device that controls an engine of the vehicle. The engine controller 140 controls acceleration of the vehicle. The engine controller 140 may be implemented with an engine management system (EMS). The engine controller 140 may control driving torque (engine torque) of the engine, based on accelerator pedal position information that is output from an accelerator pedal position sensor. Furthermore, the engine controller 140 may control engine power to follow the target driving speed provided from the autonomous driving controller 130. The engine controller 140 may output (turn on) or cut off (turn off) engine torque according to an instruction of the autonomous driving controller 130 or the transmission controller 150.

The transmission controller 150 may control a transmission (a gear-shift) of the vehicle. The transmission controller 150 may control a gear shift of the vehicle depending on a gear position and a gear state range. The transmission controller 150 may control P&G driving to which neutral coasting is applied. The transmission controller 150 may include a P&G driving condition determination device 151, a P&G controller 152, and a clutch controller 153. The P&G driving condition determination device 151, the P&G controller 152, and the clutch controller 153 may be implemented with software modules. The software modules may be stored in a memory and may be executed by a processor. The transmission controller 150 may share whether to perform P&G driving control with the autonomous driving controller 130.

The P&G driving condition determination device 151 may receive road information from the navigation device 110 and may receive the speed of a preceding vehicle from the front radar 120. The P&G driving condition determination device 151 may determine whether the vehicle satisfies a P&G driving condition, based on the road information and/or the speed of the preceding vehicle. In other words, the P&G driving condition determination device 151 may determine whether P&G driving is able to be performed, based on information about a situation ahead, such as the road information and/or the speed of the preceding vehicle.

Furthermore, the P&G driving condition determination device 151 may determine whether P&G driving is able to be performed, in consideration of vehicle speed (host-vehicle speed) information and whether P&G driving is prohibited by the autonomous driving controller 130. The P&G driving condition determination device 151 may determine that P&G driving is able to be performed, when the vehicle satisfies all of a forward situation condition, a vehicle speed condition, and a P&G driving prohibition condition. For example, the P&G driving condition determination device 151 may determine that P&G driving is able to be performed, when a curved section does not exist within 500 m ahead, a grade is within the range of ±5%, the driving speed of a preceding vehicle within 150 m ahead is not reduced by 5 kph or more, the current driving speed of the vehicle is 60 kph or more, and a P&G driving prohibition command is not received from the autonomous driving controller 130. The P&G driving condition determination device 151 may determine that P&G driving is unable to be performed, when the vehicle does not satisfy at least one of the forward situation condition, the vehicle speed condition, and the P&G driving prohibition condition.

The P&G controller 152 may control execution or stop of P&G driving, depending on the determination as to whether P&G driving is able to be performed. The P&G controller 152 may initiate P&G driving when the P&G driving condition determination device 151 determines that P&G driving is able to be performed. The P&G controller 152 may receive a target driving speed from the autonomous driving controller 130. The P&G controller 152 may determine a P&G driving speed range, based on the target driving speed.

The P&G controller 152 may control pulse driving, when the P&G driving speed range is determined. The P&G controller 152 may transmit a clutch engagement signal to the clutch controller 153 and may generate a clutch engagement flag when engagement of a clutch is completed. The P&G controller 152 may instruct the engine controller 140 to turn engine torque on. The engine controller 140 may output engine torque according to a command of the P&G controller 152. The P&G controller 152 may accelerate the vehicle by controlling output torque of the engine after the engagement of the clutch.

The P&G controller 152 may determine whether the current driving speed of the vehicle (the vehicle speed) reaches the maximum speed in the P&G driving speed range. At this time, the P&G controller 152 may detect the vehicle speed using a wheel speed sensor.

When the vehicle speed reaches the maximum speed, the P&G controller 152 may stop accelerating the vehicle and may control neutral glide driving (neutral coasting). The P&G controller 152 may transmit, to the engine controller 140, a command to turn engine torque off and prohibit acceleration. The engine controller 140 may stop (cut off) the output of the engine torque according to the command of the P&G controller 152. The P&G controller 152 may transmit, to the autonomous driving controller 130, a command to prohibit acceleration manipulation. The autonomous driving controller 130 may prohibit acceleration of the vehicle during the neutral coasting. Furthermore, the P&G controller 152 may transmit a clutch disengagement signal to the clutch controller 153. The clutch controller 153 may disengage the clutch according to an instruction of the P&G controller 152.

The P&G controller 152 may determine whether the vehicle speed reaches the minimum speed during the neutral glide driving. The P&G controller 152 may instruct the clutch controller 153 to engage the clutch before the vehicle speed reaches the minimum speed. For example, when the vehicle speed falls within a predetermined range from the minimum speed, the P&G controller 152 may request the clutch controller 153 to engage the clutch. When the vehicle speed reaches the minimum speed, the P&G controller 152 may allow for acceleration of the vehicle by switching the neutral coasting mode to a pulse driving mode.

The clutch controller 153 may engage or disengage the clutch according to an instruction of the P&G controller 152. The clutch controller 153 may share a clutch state with the P&G controller 152.

Figure 2:
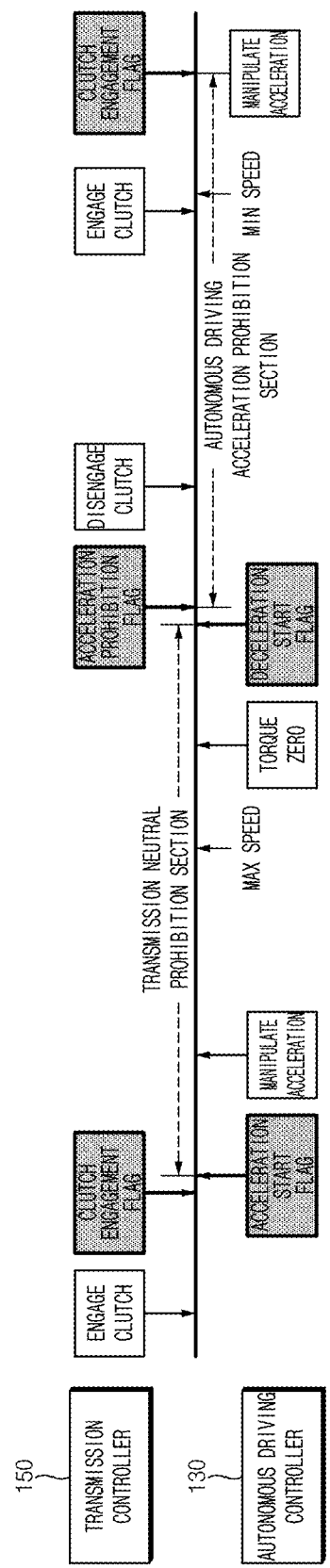
FIG. 2 is a view illustrating a powertrain control process according to embodiments of the present disclosure.

FIG. 2 is a view illustrating a powertrain control process according to embodiments of the present disclosure.

Referring to FIG. 2, the transmission controller 150 may generate (output) a clutch engagement flag when the clutch is engaged after a command to engage the clutch. The autonomous driving controller 130 may output an acceleration start flag when the engagement of the clutch is identified through the clutch engagement flag. The autonomous driving controller 130 may request engine torque from the engine controller to manipulate acceleration. The autonomous driving controller 130 may request zero engine torque from the engine controller 140 when the vehicle speed reaches the maximum speed. Furthermore, the autonomous driving controller 130 may output a deceleration start flag. The transmission controller 150 may prohibit the transmission from being in neutral from the time when the acceleration start flag is received to the time when the deceleration start flag is received.

The transmission controller 150 may output an acceleration prohibition flag when receiving the deceleration start flag. The transmission controller 150 may disengage the clutch to cause the vehicle to perform neutral coasting. The transmission controller 150 may engage the clutch before the vehicle speed reaches the minimum speed. The transmission controller 150 may output a clutch engagement flag after the vehicle speed reaches the minimum speed. The autonomous driving controller 130 may perform acceleration manipulation again when receiving the clutch engagement flag. The autonomous driving controller 130 may prohibit acceleration of the vehicle from the time when the acceleration prohibition flag is received to the time when the clutch engagement flag is received.

Figure 3:
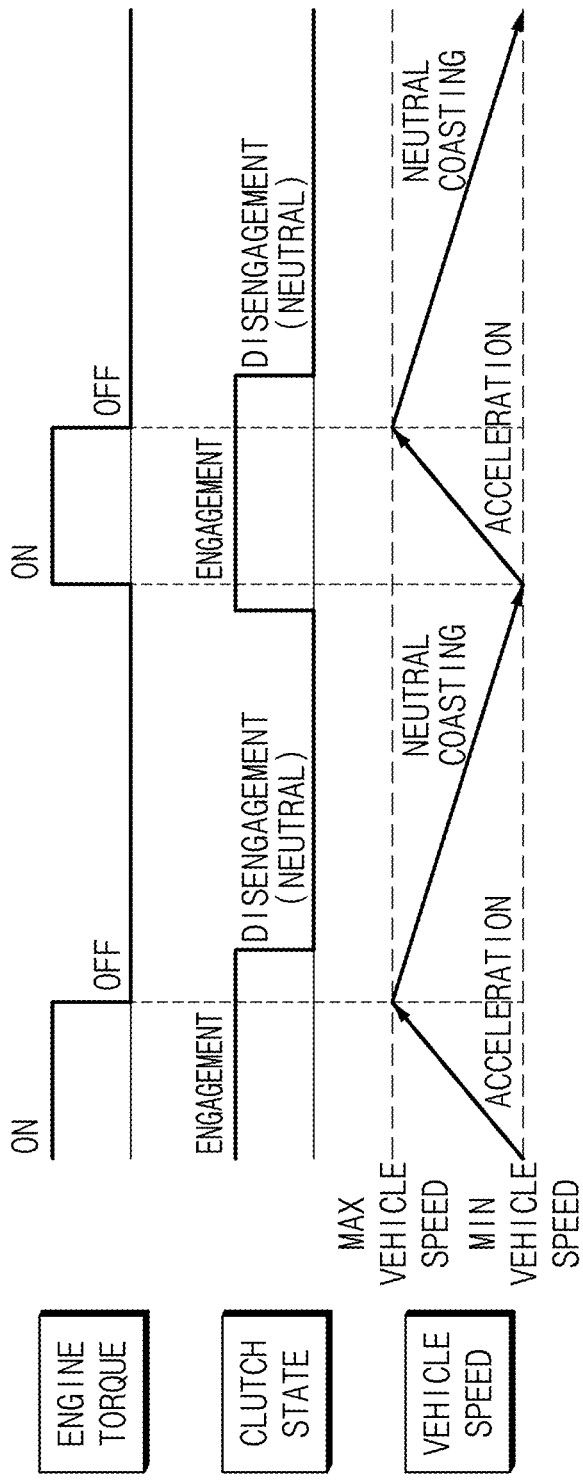
FIG. 3 is a state diagram illustrating a powertrain control process according to embodiments of the present disclosure.

FIG. 3 is a state diagram illustrating a powertrain control process according to embodiments of the present disclosure.

Referring to FIG. 3, the vehicle may accelerate until the vehicle speed reaches the maximum speed, with engine torque turned on and the clutch engaged. The autonomous driving controller 130 may request zero engine torque from the engine controller 140 when the vehicle speed reaches the maximum speed. The engine controller 140 may switch the engine torque from the ON state to an OFF state in response to the request of the autonomous driving controller 130. The autonomous driving controller 130 may generate a deceleration start flag after requesting zero engine torque. When receiving the deceleration start flag, the transmission controller 150 may output an acceleration prohibition flag and may disengage the clutch. The vehicle may perform neutral coasting (neutral glide) until the vehicle speed reaches the minimum speed in the state in which the clutch is disengaged. The transmission controller 150 may instruct engagement of the clutch before the vehicle speed reaches the minimum speed. When the vehicle speed reaches the minimum speed, the transmission controller 150 may request the engine controller 140 to output engine torque and may transmit a clutch engagement flag. The autonomous driving controller 130, when receiving the clutch engagement flag, may transmit an engine torque command to the engine controller 140. The engine controller 140 may adjust the output torque of the engine according to the command of the autonomous driving controller 130.

Figure 4:
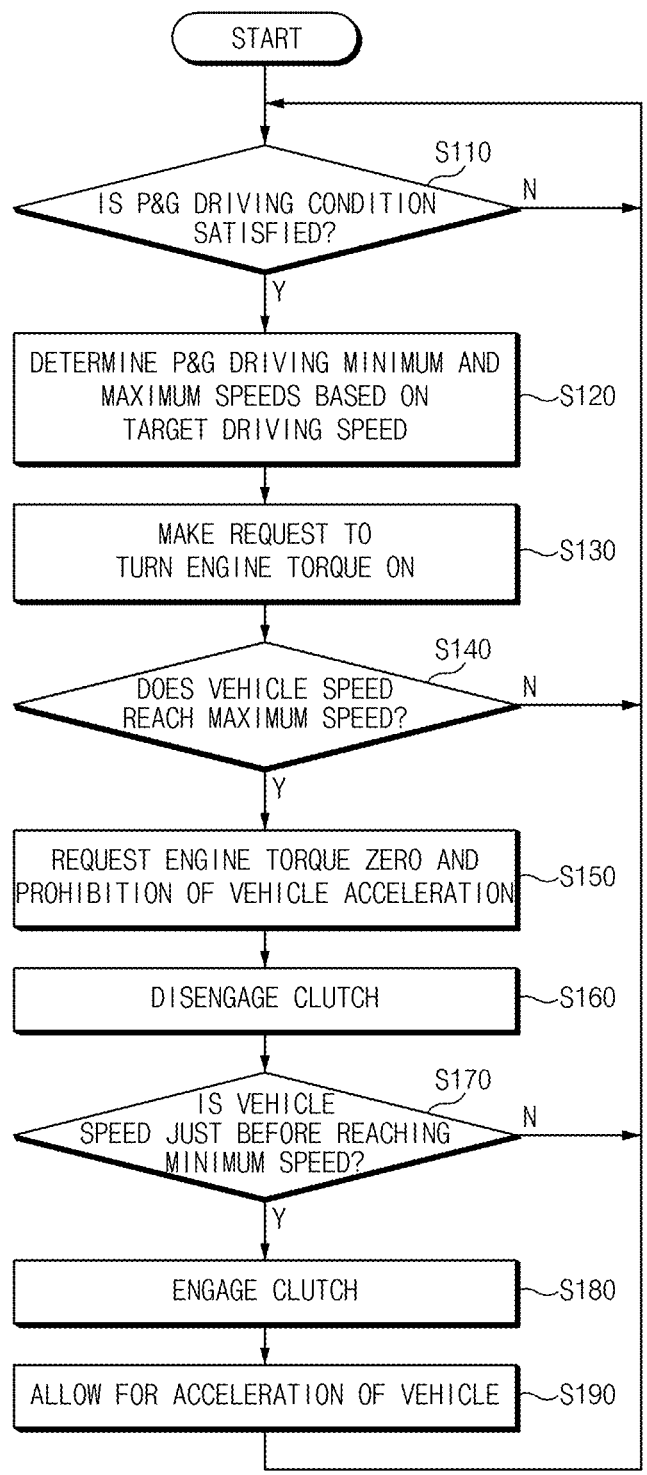
FIG. 4 is a flowchart illustrating a method for controlling the powertrain of the autonomous vehicle according to embodiments of the present disclosure.

FIG. 4 is a flowchart illustrating a method for controlling the powertrain of the autonomous vehicle according to embodiments of the present disclosure.

The transmission controller 150 may determine whether the vehicle satisfies a P&G driving condition during autonomous driving (S110). The transmission controller 150 may determine whether the vehicle satisfies the P&G driving condition, based on information about a road ahead (e.g., curvature and/or grade) and the speed of a preceding vehicle that are provided from the navigation device 110 and the front radar 120. The transmission controller 150 may determine whether P&G driving is able to be performed, in consideration of a vehicle speed condition and a P&G driving prohibition condition in addition to a situation ahead.

The transmission controller 150 may determine P&G driving maximum and minimum speeds, based on a target driving speed (S120). When the vehicle satisfies the P&G driving condition, the transmission controller 150 may determine that P&G driving is able to be performed. The P&G controller 152 may receive the target driving speed from the autonomous driving controller 130. The P&G controller 152 may determine a P&G driving speed range, based on the target driving speed.

The transmission controller 150 may make a request to turn engine torque on (S130). The transmission controller 150 may control pulse driving when the P&G driving speed range is determined. The transmission controller 150 may engage the clutch and may request the engine controller 140 to turn the engine torque on. The engine controller 140 may control the output of the engine torque in response to the request of the transmission controller 150. The transmission controller 150 may control the clutch and the engine to cause the vehicle to perform pulse driving (acceleration).

The transmission controller 150 may determine whether the vehicle speed reaches the maximum speed (S140). The transmission controller 150 may identify the vehicle speed through the wheel speed sensor and/or the autonomous driving controller 130.

The transmission controller 150 may request zero engine torque and prohibition of acceleration from the engine controller 140 when the vehicle speed reaches the maximum speed (S150). When the vehicle speed reaches the maximum speed, the transmission controller 150 may stop the pulse driving and may control neutral glide driving (neutral coasting). The transmission controller 150 may transmit, to the engine controller 140, a request to turn the engine torque off and prohibit acceleration. The engine controller 140 may stop (cut off) the output of the engine torque in response to the request of the transmission controller 150. Furthermore, the transmission controller 150 may request prohibition of acceleration manipulation (acceleration control) from the autonomous driving controller 130.

The transmission controller 150 may disengage the clutch (S160). The transmission controller 150 may cause the vehicle to perform neutral glide driving (neutral coasting), by disengaging the clutch.

The transmission controller 150 may determine whether the vehicle speed is just before reaching the minimum speed (S170). The vehicle may perform the neutral coasting until the vehicle speed falls within a predetermined range from the minimum speed.

The transmission controller 150 may engage the clutch when the vehicle speed reaches the minimum speed (S180).

The transmission controller 150 may allow for acceleration of the vehicle when the engagement of the clutch is completed (S190). The transmission controller 150 may request engine torque control from the engine controller 140 when the vehicle speed reaches the minimum speed. The engine controller 140 may control the output of the engine torque according to a command of the autonomous driving controller 130 to allow the vehicle to accelerate.

Figure 5:
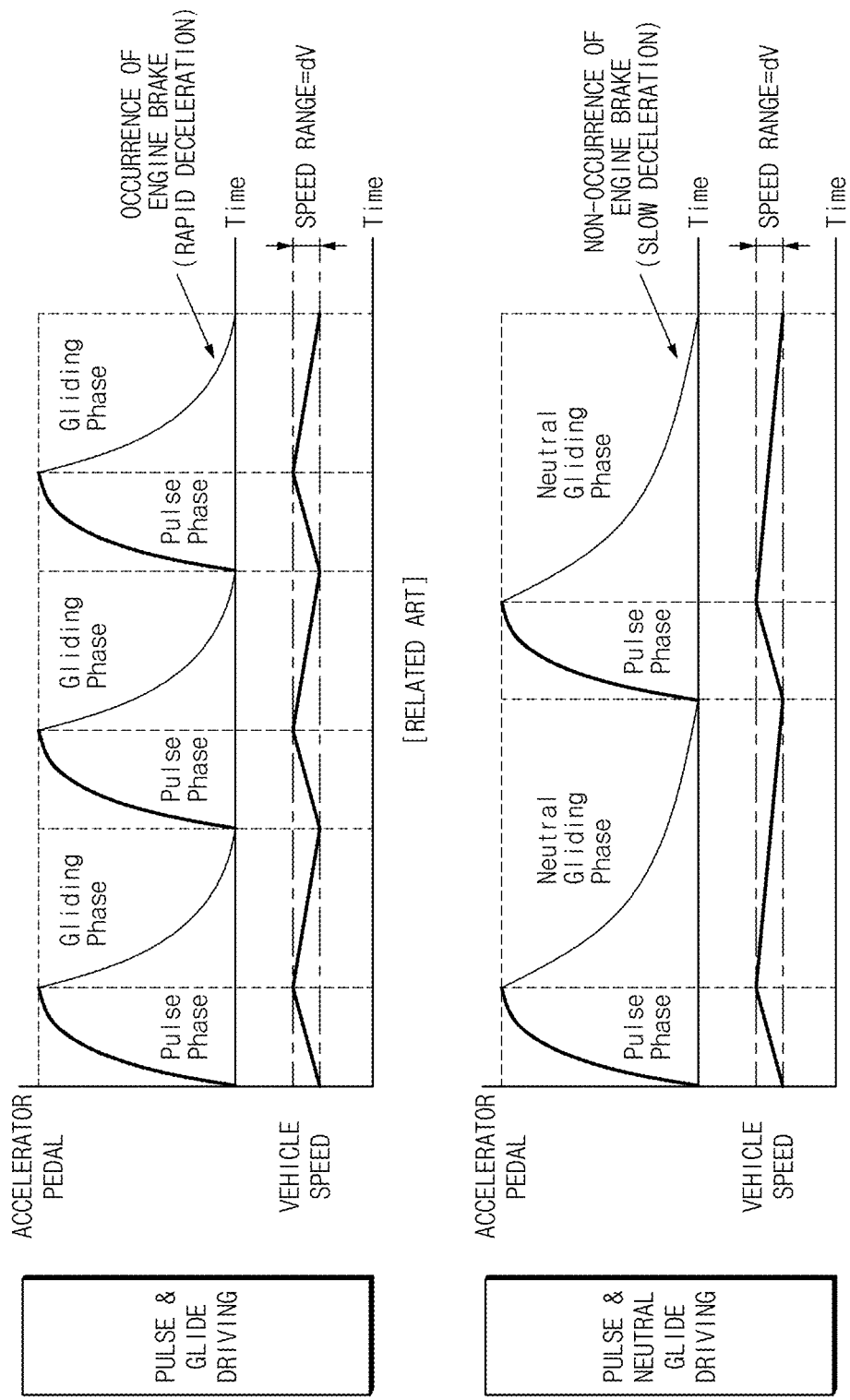
FIG. 5 is a view illustrating a P&G driving effect of the autonomous vehicle according to embodiments of the present disclosure.

FIG. 5 is a view illustrating a P&G driving effect of the autonomous vehicle according to embodiments of the present disclosure.

Referring to FIG. 5, in a pulse section during P&G driving, the vehicle may be accelerated until the vehicle speed reaches the maximum speed in the P&G driving speed range. The maximum speed may be reached by engaging the clutch and controlling torque output of the engine as in the related art.

In contrast, in a glide section, the clutch is disengaged, and neutral glide driving is performed by a neutral coasting method. Accordingly, the vehicle may be decelerated more slowly than in the related art. As the deceleration speed of the vehicle slows down, the distance which the vehicle is able to move in the glide section is increased, resulting in an improvement in fuel economy.

According to the present disclosure, pulse & glide driving is performed through cooperative control of an engine and a clutch during autonomous driving. Accordingly, fuel economy may be improved even though a driver is not familiar with pulse & glide driving operation.

In addition, according to the present disclosure, inconvenience caused by a delay in acceleration/deceleration response may be resolved through early engagement and disengagement of the clutch in the cooperative control of the engine and the clutch.

Hereinabove, although the present disclosure has been described with reference to several embodiments and the accompanying drawings, the present disclosure is not limited thereto, but may be variously modified and altered by those having ordinary skill in the art to which the present disclosure pertains without departing from the spirit and scope of the present disclosure claimed in the following claims. Therefore, the embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling a powertrain of an autonomous vehicle, the apparatus comprising:
    an autonomous driving controller configured to control autonomous driving of the vehicle; and
    a transmission controller configured to determine whether the vehicle satisfies a pulse and glide (P&G) driving condition during the autonomous driving and to alternately perform pulse driving and coasting in conjunction with the autonomous driving controller when the vehicle satisfies the P&G driving condition,
    wherein the transmission controller is configured to
        cause a transmission to remain in a neutral state during the coasting,
        engage the clutch when vehicle speed falls within a predetermined range from minimum speed in a P&G driving speed range during the coasting, and
        request engine torque control to the engine controller when the vehicle speed reaches the minimum speed.

2. The apparatus of claim 1, wherein the transmission controller receives, from a navigation device, information about a road ahead, receives speed of a preceding vehicle from a front radar, and determines whether the vehicle satisfies the P&G driving condition, based on the information about the road ahead and the speed of the preceding vehicle.

3. The apparatus of claim 1, wherein the transmission controller determines whether the vehicle satisfies the P&G driving condition, in consideration of current driving speed of the vehicle and whether P&G driving is prohibited.

4. The apparatus of claim 1, wherein the transmission controller receives a target driving speed from the autonomous driving controller and determines the P&G driving speed range based on the target driving speed.

5. The apparatus of claim 4, wherein the transmission controller engages a clutch and thereafter requests an engine controller to output engine torque, and the autonomous driving controller performs the pulse driving through acceleration driving control.

6. The apparatus of claim 5, wherein the transmission controller performs the coasting by requesting the engine controller to stop the output of the engine torque and disengaging the clutch when the vehicle speed reaches maximum speed in the P&G driving speed range during the pulse driving.

7. The apparatus of claim 6, wherein the transmission controller performs the pulse driving again when the vehicle speed falls within the predetermined range from minimum speed in the P&G driving speed range during the coasting.

8. The apparatus of claim 5, wherein the transmission controller prohibits the transmission from being in neutral during the pulse driving.

9. The apparatus of claim 5, wherein the transmission controller requests the autonomous driving controller to prohibit acceleration manipulation during the coasting and requests the engine controller to prohibit acceleration during the coasting.

10. A method for controlling a powertrain of an autonomous vehicle, the method comprising:
    a step of determining whether the vehicle satisfies a pulse and glide (P&G) driving condition during autonomous driving;
    a step of performing pulse driving, when the vehicle satisfies the P&G driving condition;
    a step of performing coasting with a transmission in neutral, when the vehicle satisfies a condition for ending the pulse driving; and
    a step of returning to the step of performing the pulse driving, when the vehicle satisfies a condition for ending the coasting,
    wherein the step of performing the coasting includes
        a step of engaging the clutch when vehicle speed falls within a predetermined range from minimum speed in a P&G driving speed range during the coasting, and
        a step of requesting engine torque control to the engine controller when the vehicle speed reaches the minimum speed.

11. The method of claim 10, wherein the step of determining whether the vehicle satisfies the P&G driving condition includes:
- a step of receiving, from a navigation device, information about a road ahead;
- a step of receiving speed of a preceding vehicle from a front radar; and
- a step of determining whether the vehicle satisfies the P&G driving condition, based on the information about the road ahead and the speed of the preceding vehicle.

12. The method of claim 11, wherein the step of determining whether the vehicle satisfies the P&G driving condition further includes:
- a step of determining whether the vehicle satisfies the P&G driving condition, in consideration of current driving speed of the vehicle and whether P&G driving is prohibited.

13. The method of claim 10, wherein the step of performing the pulse driving includes:
- a step of receiving a target driving speed from an autonomous driving controller; and
- a step of determining the P&G driving speed range based on the target driving speed.

14. The method of claim 13, wherein the step of performing the pulse driving further includes:
- a step of engaging a clutch, requesting an engine controller to output engine torque, and causing the autonomous driving controller to perform acceleration driving control; and
- a step of determining whether vehicle speed reaches maximum speed in the P&G driving speed range.

15. The method of claim 14, wherein the step of performing the coasting includes:
- a step of requesting the engine controller to stop the output of the engine torque when the vehicle speed reaches the maximum speed;
- a step of performing the coasting by disengaging the clutch after the output of the engine torque is stopped; and
- a step of determining whether the vehicle speed is within the predetermined range from minimum speed in the P&G driving speed range.

16. The method of claim 15, wherein the step of returning to the step of performing the pulse driving includes:
- a step of engaging the clutch, when the vehicle speed is within the predetermined range from the minimum speed; and
- a step of requesting the engine controller to output engine torque after the clutch is engaged.

17. The method of claim 10, further comprising:
- a step of prohibiting the transmission from being in neutral while the pulse driving is performed.

18. The method of claim 10, further comprising:
- a step of requesting an autonomous driving controller to prohibit acceleration manipulation during the coasting and requesting an engine controller to prohibit acceleration during the coasting.

* * * * *